Jan. 16, 1923.
S. B. ARNOLD.
INTERNAL COMBUSTION ENGINE.
FILED JULY 14, 1919.
1,442,461
6 SHEETS-SHEET 3
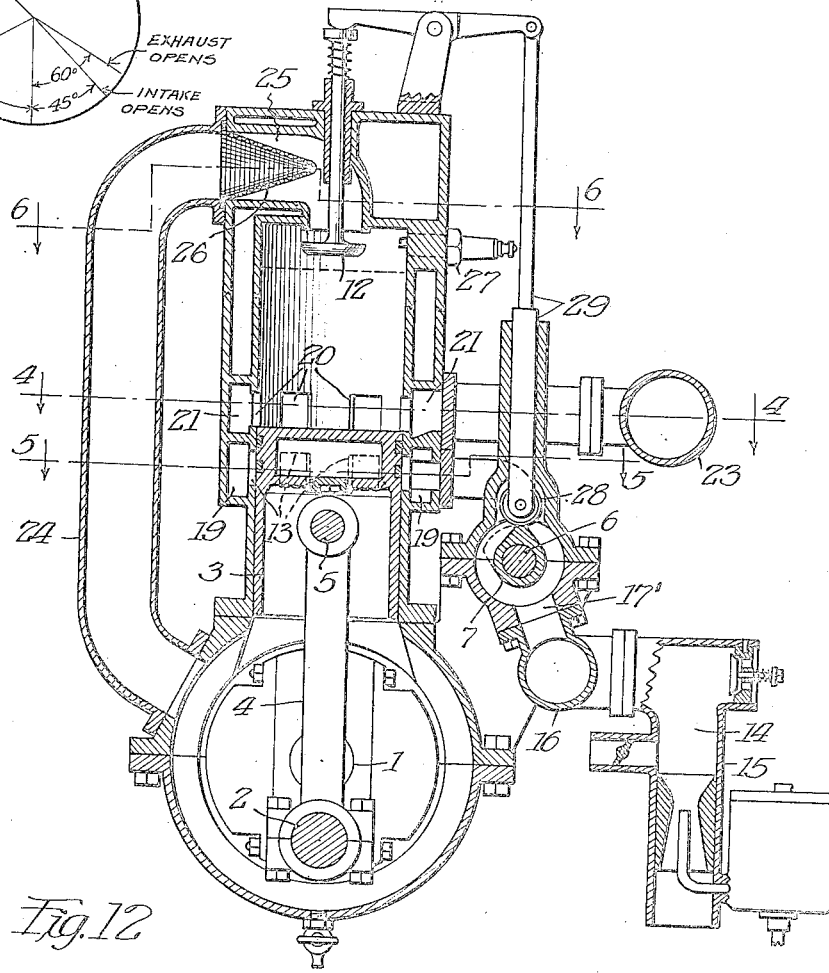
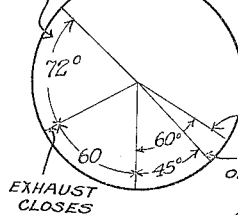
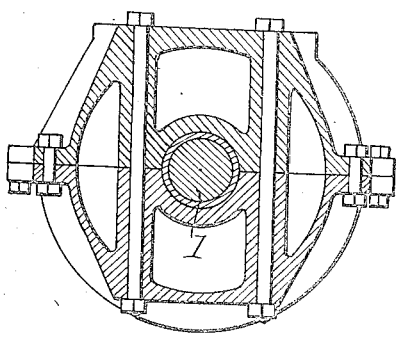
Inventor
Stanley B. Arnold

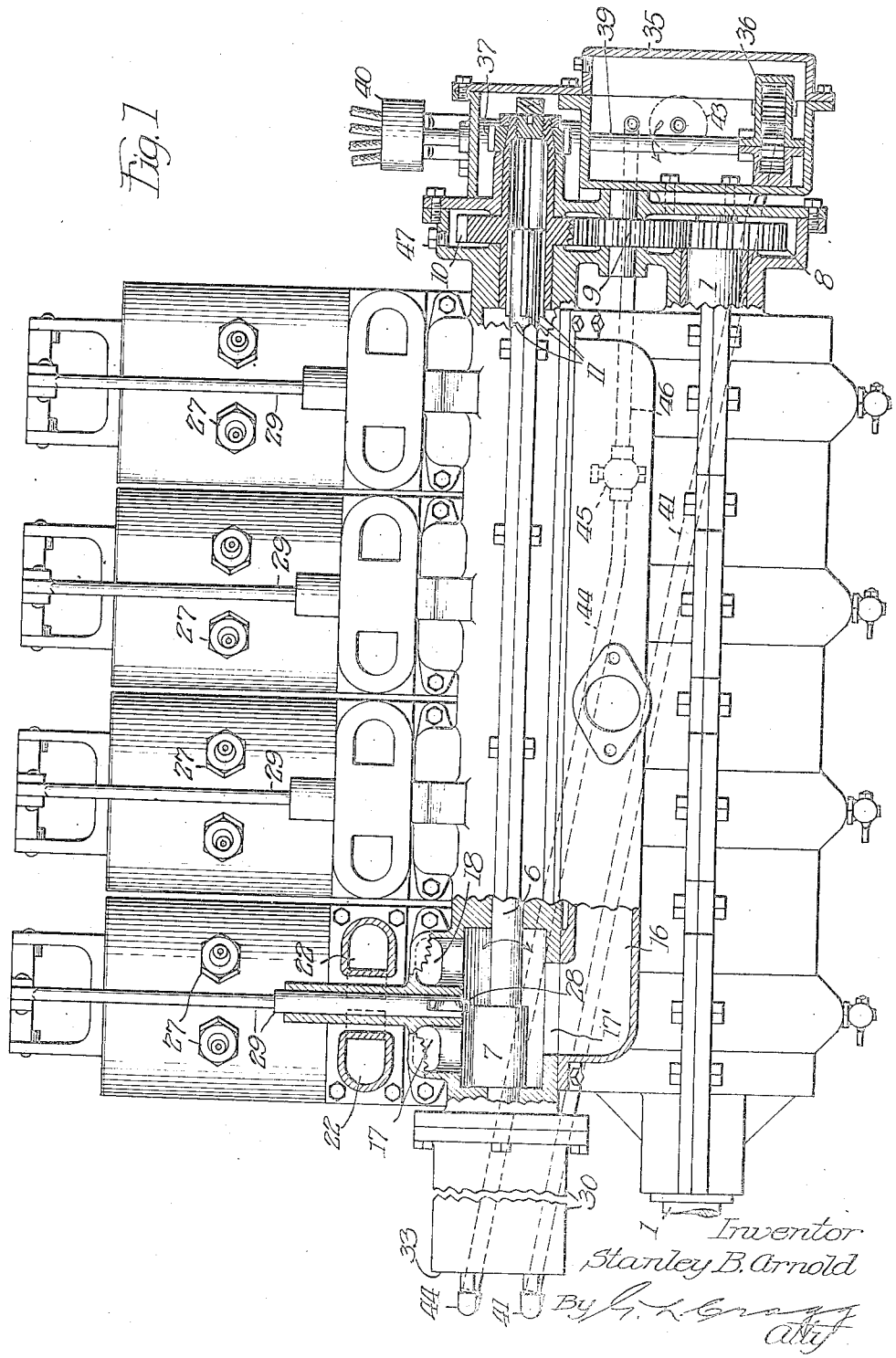

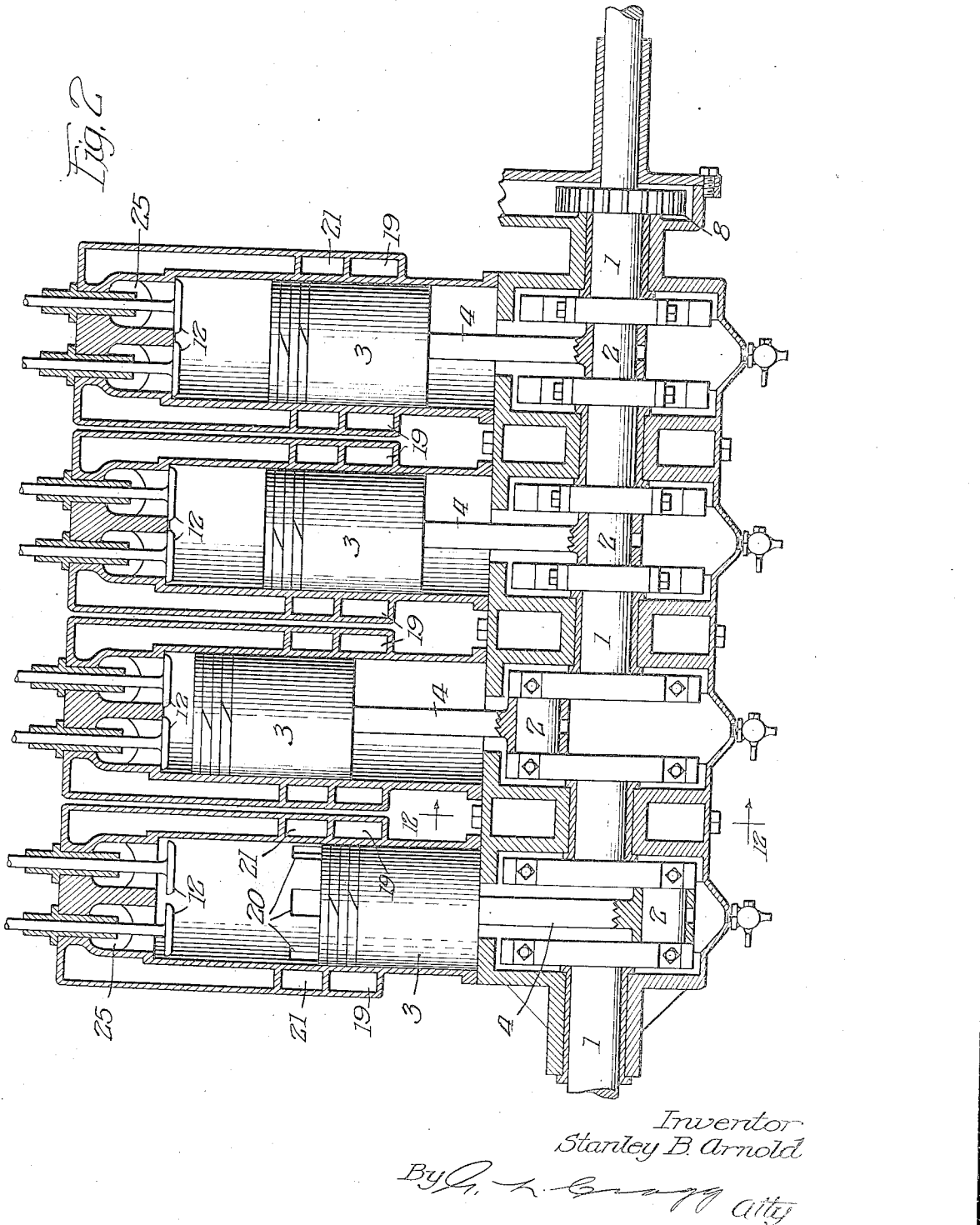

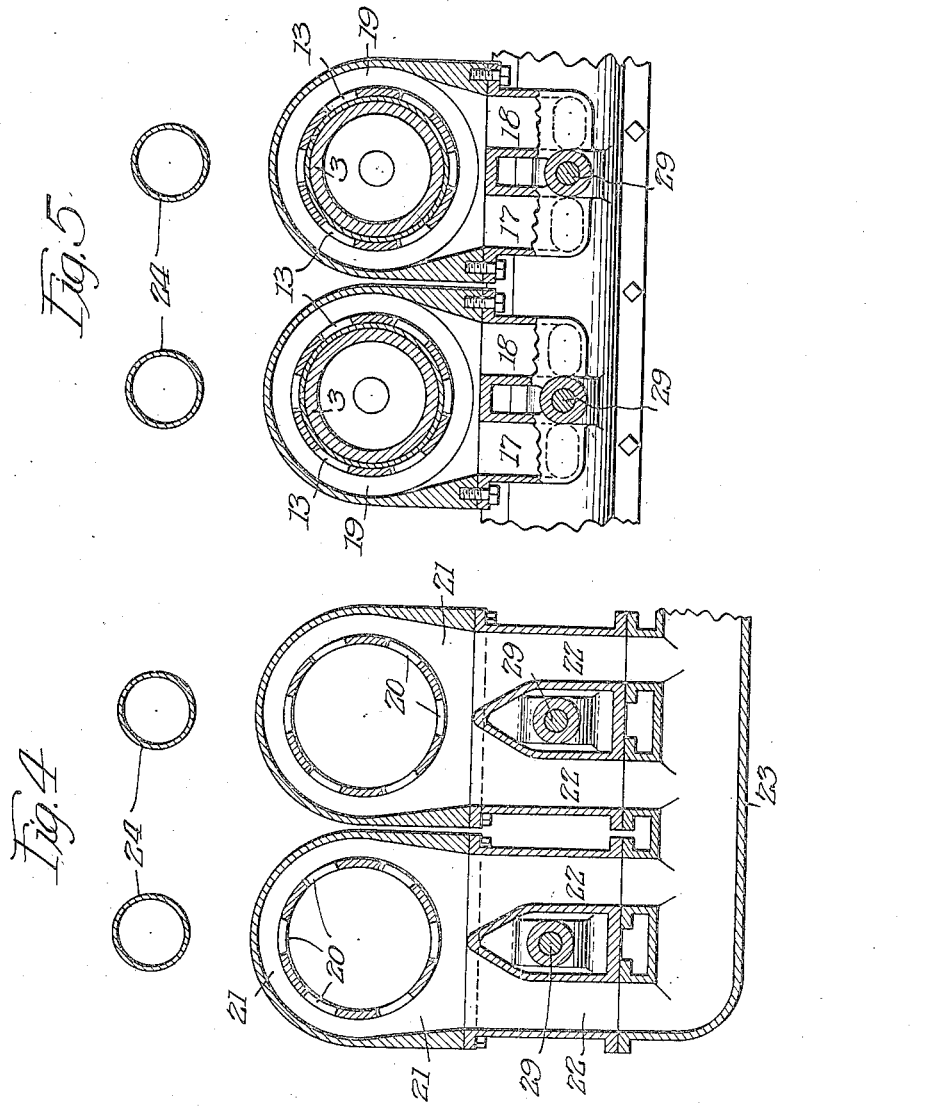

Jan. 16, 1923.
S. B. ARNOLD.
INTERNAL COMBUSTION ENGINE.
FILED JULY 14, 1919.
1,442,461
6 SHEETS-SHEET 5
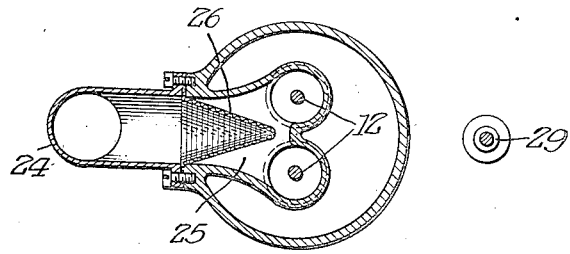
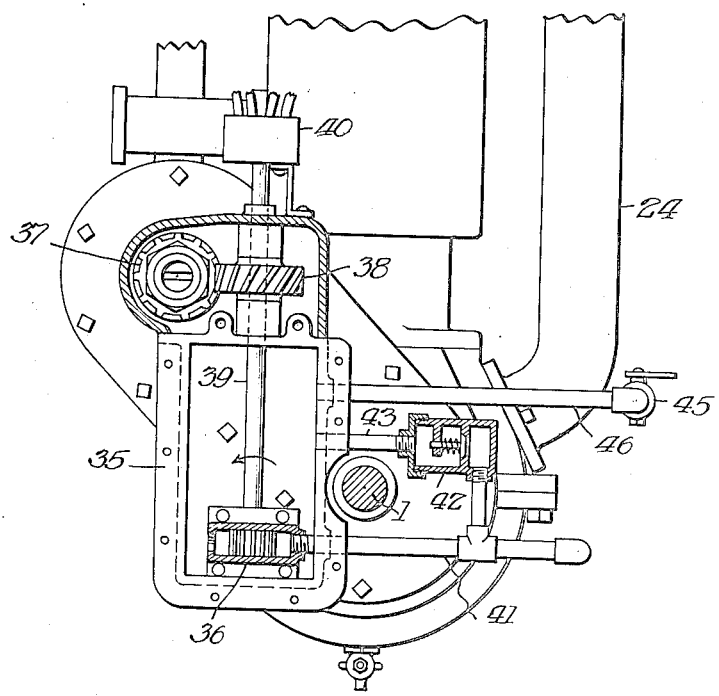
Inventor
Stanley B. Arnold

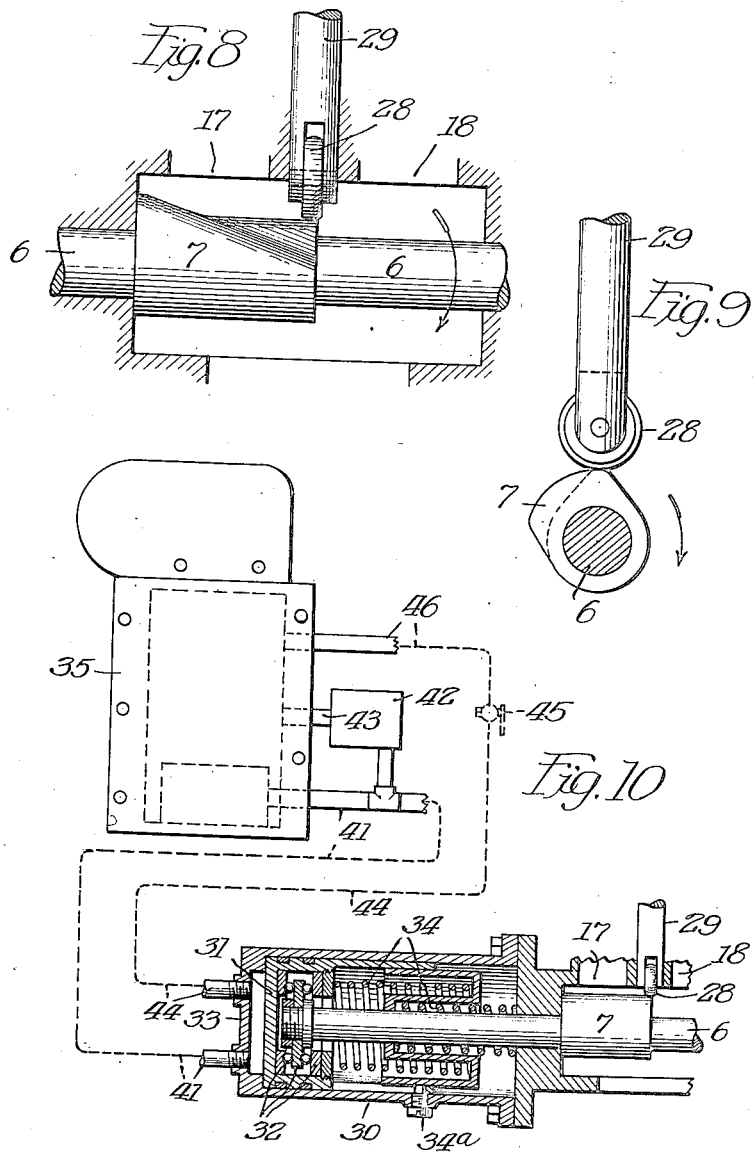

Patented Jan. 16, 1923.

1,442,461

UNITED STATES PATENT OFFICE.

STANLEY B. ARNOLD, OF CHICAGO, ILLINOIS.

INTERNAL-COMBUSTION ENGINE.

Application filed July 14, 1919. Serial No. 310,571.

*To all whom it may concern:*

Be it known that I, STANLEY B. ARNOLD, citizen of the United States, residing at Chicago, in the county of Cook and State of Illinois, have invented a certain new and useful Improvement in Internal-Combustion Engines, of which the following is a full, clear, concise, and exact description.

The engine of my invention is of the type in which a full charge of gaseous fuel from the crank case enters the cylinder and consequently practically completely exhausts the burned gases from the cylinder when the piston is at the end of its explosion stroke and in which a valve at the end of the cylinder remote from the crank shaft and through which communication between the crank case and the cylinder is established is controllable in such manner that its time of closing can be varied with relation to the position of the piston in the cylinder so as to allow varied quantities of gaseous fuel to remain in the cylinder after said valve closes. This variable time of closing of the valve effects varied power output from the engine and varied speed of rotation of the crank shaft similar to the effect of throttling in usual types of internal combustion engines.

In engines of such type as this engine, there is sure to be some mixing of the gaseous fuel after it has entered the cylinder with the burned gases, most of which burned gases are exhausted from the cylinder. When the time of closing of the valve through which communication is established between the crank case and the cylinder is considerably delayed with relation to the position of the piston in the cylinder, so that the engine produces comparatively little power, some of the burned gas that has remained in the cylinder will be forced back into the crank case or into the passages leading to the crank case. Thus the succeeding charge of gaseous fuel entering the cylinder will be to some degree contaminated by burned gas and consequently rendered less potent. When this succeeding charge has entered the cylinder it mixes with the burned gases in the cylinder as before described and consequently the proportion of burned gas mixed with it increases. When part of the contents of the cylinder is again forced back into the crank case or into the passages leading to the crank case when the piston ascends in the cylinder, through the valve through which communication is established between the crank case and the cylinder, there will be a greater proportion of burned gas forced back into the crank case or into the passages leading to the crank case than previously was so forced back, and so it is evident that as the engine continues to operate the proportion of burned gas forced back into the crank case or into the passages leading to the crank case will continue to increase. Thus the explosions will be continually rendered less potent. This results in the slowing down of the engine, if the load does not change, to an approximately certain speed, after which there is no further slowing down in speed on account of the fact that the accumulation of burned gas in the gaseous fuel in the passages leading to the crank case and in the crank case results in less and less explosion pressure in the cylinder and consequently less and less burned gas to be exhausted therefrom. Consequently, after the engine slows down sufficiently, the gaseous fuel entering the crank case is sufficient to keep the proportion of burned gas in the crank case and in the passages leading thereto from increasing further. Or, if the results from the accumulation of burned gas in the crank case and in the passages leading thereto are not as described above, the engine will continue to slow down on account of the continued accumulation of burned gas in the crank case and in the passages leading thereto, until disfiring in the cylinder occurs, after which the engine will partially clear itself of burned gas and speed up, and this action will continue as long as the operation of the engine continues. The exact results from the accumulation of burned gas in the crank case and in the passages leading thereto depend upon the design, the time of closing of the valve in the end of the cylinder remote from the crank shaft through which communication between the cylinder and the crank case is established, the time of the spark, the proportions of fuel in the gaseous fuel, the nature of the fuel, etc. If the time of closing the valve in the end of the cylinder remote from the crank shaft has not been much delayed these efforts will probably not occur or will not be so serious on account of the fact that at such times the gaseous fuel contained in the end region of the cylinder remote from the crank shaft will be practically unmixed with burned gas because practically all of the gaseous fuel that has become mixed with the burned gas will then be at the other end of the cylinder close to the piston and practically no burned gas will be forced back into the crank case and into the passages leading thereto. An engine of this type, if properly designed, will operate successfully without a governing device so long as the engine is not to be operated at a low power output, but if a low power output is desired a governor is desirable.

By means of my invention I reduce the accumulation of burned gas in the gaseous fuel in the crank case and in the passage leading thereto, when the engine operates continuously, so that such an engine will operate satisfactorily at a lower power output if without a governor, and if provided with a governor, will be less dependent upon it for satisfactory operation at low power output and will not, at such time, require so great an amount of controlling action from the governor. Also the gaseous fuel entering the cylinder will be always less mixed with burned gas and greater power and efficiency will result.

I will explain my invention more fully by reference to the accompanying drawings showing the preferred embodiment thereof and in which Fig. 1 is a view in elevation, partially in section, of an engine embracing the invention; Fig. 2 is a view somewhat diagrammatic and in longitudinal section, of the engine shown in Fig. 1; Fig. 3 is a view, mainly in cross section; Fig. 4 is a sectional view on line 4—4 of Fig. 3; Fig. 5 is a sectional view on line 5—5 of Fig. 3; Fig. 6 is a sectional view on line 6—6 of Fig. 3; Fig. 7 is an end view partially in section; Fig. 8 is a side view illustrative of a valve controlling cam mechanism; Fig. 9 is an end view of the mechanism of Fig. 8; Fig. 10 is a diagrammatic view of the governor for controlling the position of the cam shown in Figs. 8 and 9; Fig. 11 is a diagram of the cycle of operations; and Fig. 12 is a sectional view on line 12—12 of Fig. 2.

Like parts are indicated by similar characters of reference throughout the different figures.

The drawings show a two stroke cycle internal combustion engine, by which I mean that in each cylinder a cycle is completed every two strokes of the piston. Thus there is in each cylinder an explosion during every down stroke of the piston.

The principal advantage of this engine over other two stroke cycle engines is that in it substantially complete scavenging of the burned gases is effected at all amounts of power output and at all speeds of rotation of its crank shaft.

There are four cylinders shown, although there may be any number of cylinders in an engine covered by this invention. The cranks are preferably placed at equal distances around the crank shaft, relatively to each other. Thus the four cranks in this engine are placed at ninety degrees from each other around the crank shaft. A flywheel would be placed on the left hand end of the crank shaft. When the crank shaft 1 and crank 2 rotate, a piston 3 is caused to ascend by means of a connecting rod 4 and gudgeon pin 5. As the crank shaft 1 rotates, the cam shaft 6 (on which is placed a cam 7) is rotated by means of gears 8, 9 and 10 in the same direction as the crank shaft and at the same speed. Cam shaft 6 extends into the gear 10 and carries splines 11 which mesh with spline slots in the gear 10 allowing positive rotative connection but relative longitudinal sliding between the cam shaft 6 and the gear 10. For the present the cam shaft 6 will be considered as being at the left hand limit of its longitudinal position as shown in Fig. 3. When the piston 3 has ascended but a short distance the cam shaft 6 and cam 7 have rotated and allowed the intake valves 12 to close, with the result that when the piston 3 continues to ascend a vacuum is created in the interior of the crank case. Each crank case in the engine is a separate closed chamber and, with the working parts enclosed in it, is designed so as to economize on empty space. When piston 3 ascends and uncovers intake ports 13, fuel and oil and air mixture rush from the mixing chamber 14 of the carburetor 15 and through the intake manifold 16 and port 17' and around cam shaft 5 and the cam 7 and passages 17 and 18 and annular chamber 19, through the intake ports 13 and so into the interior of the cylinder below piston 3 and the crank case. In this engine lubrication is accomplished by mixing lubricating oil with the fuel and passing the resulting mixture of lubricating oil and fuel through the carburetor 15. This system of lubrication is the preferred method of lubrication for this engine but various other systems of lubrication are applicable.

By passing the fuel and oil and air mixture around the cam shaft and cams in this engine, I effect thorough lubrication of these and the adjoining working parts.

When the piston 3 descends and covers intake ports 13, the fuel and oil and air mixture in the cylinder below the piston 3 and in the crank case is compressed. When the piston 3 descends, an explosion is taking place in the cylinder above the piston 3. I shall explain later how such explosion takes place. The piston 3 descends and uncovers the exhaust ports 20 when at the lower limit of its stroke, and most of the burned gases in the cylinder rush out of exhaust ports 20 and the annular chamber 21 and passages 22 and so into the exhaust manifold 23 and from there to the outside atmosphere. Shortly after the piston 3 begins to uncover the exhaust ports 20, the intake valves 12 are opened by the cam 7 which has rotated sufficiently to accomplish this result. The interior of the crank case is connected by the tube 24 with the intake passage 25 in the head of the cylinder. Wire gauze cone 26 is placed in the intake passage 25. Thus when the intake valve 12 is opened by the cam 7, most of the compressed fuel and oil and air mixture in the interior of the crank case and the cylinder below the piston 3 rushes through the tube 24 and wire gauze cone 26 and the intake passage 25 and past the intake valves 12 into the interior of the cylinder above the piston 3. The fuel and oil and air mixture thus entering the cylinder above the piston 3 fills that end of the cylinder, practically completely forcing the residue of burned gases that was left in the cylinder above the piston 3 out of the cylinder through the exhaust ports.

Piston 3 now ascends and covers the exhaust ports 20. The cam 7 rotates as the piston 3 ascends and allows the intake valves 12 to close at about the same instant as that at which the piston 3 covers the exhaust ports 20. When the piston 3 continues to ascend, it compresses the fuel and oil and air mixture that is contained in the cylinder above the piston 3, and when the piston 3 is near the upper limit of its ascent the now highly compressed fuel and oil and air mixture above the piston 3 is ignited by means of the spark plug or plugs 27 and an explosion results, which explosion continues when the piston 3 descends after reaching the limit of its ascent. I have now explained how an explosion takes place in the cylinder above the piston 3 when the piston 3 descends and have described so far the operation of the engine when running with no delay in the time of closing of intake valves 12. I will now describe the method of effecting lesser power output and speed of rotation of the crank shaft while effecting substantially complete scavenging of the burned gases from the cylinder at all times.

The cam shaft 6, as I have previously described, is so made that it can be slid longitudinally while at all times retaining its rotative connection with the gear 10. This sliding of the cam shaft 6 is effected by means of an engine operated oil control system, which oil control system is also a speed governor for the engine, but it is not necessary to describe this oil control system for the present.

The cam 7 is made so that the face by which it opens the intake valves 12 is straight, but the face by which it allows the intake valves 12 to close is on a slant around the cam, as is shown in Figs. 8 and 9. Consequently the time of opening of the intake valves 12, relatively to the position of the piston 3 in the cylinder, does not change, regardless of the longitudinal position of the cam shaft 6 and the cam 7 with relation to the cam roller 28 in the push rod 29. But when the cam shaft 6 and the cam 7 are moved longitudinally to the right, relatively to the cam roller 28, the time of closing the intake valves 12 is delayed, and when the cam shaft 6 and cam 7 are in their extreme right hand position relatively to cam roller 29 in Fig. 8, a very considerable amount of delay in the closing of the intake valves 12 is effected.

Fig. 11 shows the valve and port opening and closing diagrammatically as I have designed this engine although other times of valve and port opening and closing can be used. In Fig. 11 the piston begins to uncover the exhaust ports when the crank is sixty degrees before the lower center. The intake valves begin to open when the crank is forty-five degrees before the lower center. The piston completely covers the exhaust ports when the crank is sixty degrees beyond the lower center. The time of complete closing of the intake valves varies from the same instant as that at which the piston completely covers the exhaust ports, which is when the crank is sixty degrees beyond the lower center, to an instant when the crank has rotated seventy-two degrees farther toward the upper center.

The result of delaying the time of closing of the intake valves 12 is that when the piston 3 ascends in the cylinder, after covering the exhaust ports 20, it forces the fuel and oil and air mixture contained in the cylinder above the piston 3 back past the intake valves 12 and through the intake passage 25 and wire gauze cone 26 and tube 24, and so back toward the interior of the crank case, thus relieving the vacuum that would otherwise be created therein by the ascent of the piston 3. This forcing of the fuel and oil and air mixture back toward the interior of the crank case continues until the intake valves 12 close, which time depends upon the longitudinal position of the cam shaft 6 and the cam 7 relatively to the cam roller 28, after which time the piston 3 compresses the fuel and oil and air mixture contained in the cylinder above the piston 3 and creates a vacuum in the cylinder below the piston 3 and in the interior of the crank case.

It is evident that by moving the cam shaft 6 and the cam 7 to the right or left, relatively to cam roller 28, I vary the amount of fuel and oil and air mixture passing through this engine, effecting varied power output from the engine and varied speed of rotation of its crank shaft similar to the effect of throttling in usual types of internal combustion engines, and also that I effect substantially complete scavenging of the burned gases from its cylinder at all times.

The reason for placing wire gauze cone 26 in the intake passage 25 is to prevent ignition of the fuel and oil and air mixture in the tube 24 and the interior of the crank case if there should otherwise be at any time danger of such ignition on account of a slow burning charge of fuel and oil and air mixture in the cylinder from a relatively small amount of fuel in the mixture, a late time of spark, and various other reasons.

Fig. 2 shows how I have placed the cranks in the engine so that they are at ninety degrees to each other but with a pair of cranks at each end of the engine at one hundred and eighty degrees to each other. This arrangement will result in a well balanced engine.

I will now describe the oil control and governor system shown in Figs. 1, 2 and 10. In Fig. 1 the oil control cylinder 30 is shown placed at the left hand end of cam shaft housing. Fig. 10 shows the oil control cylinder 30 and its enclosed and adjoining parts in section. The oil control piston 31 slides in an oil control cylinder 30 and is in operative connection with the end of the cam shaft 6 by means of a ball thrust bearing assembly 32 and is normally forced against the head 33 of the oil control cylinder 30 by the springs 34. The oil control piston 31 is prevented from rotation by a screw 34ª which projects into a slot in the oil control piston 31 as shown. In Figs. 1 and 7 is shown an oil tank 35 containing a gear oil pump 36 submerged in oil. The oil pump 36 is operated by a worm gear 37, which gear is placed on the extended hub of the gear 10, worm gear 38, and shaft 39. The shaft 39 supports and operates the ignition timing device 40.

The outlet side of the oil pump 36 is connected by the tube 41 to the head 33 of the oil control cylinder 30. The oil safety valve 42 connects with the tube 41 and discharges into the oil tank 35 through the tube 43. The head 33 of the oil control cylinder 30 is connected by the tube 44, valve 45, and tube 46 with the oil tank 35.

The operation of this oil control system is as follows: When the engine is not running, springs 34 force the oil control piston 31 against the head 32 of the oil control cylinder 30, thus sliding the cam shaft 6 in its extreme left hand or full throttle position. Should the valve 45 be wide open when the engine is started, it starts under full throttle. When it begins to speed up, the operator partially closes the valve 45 causing the exit of oil from the oil control cylinder 30 to be constricted, with the result that more oil is pumped into the oil control cylinder 30 than escapes from it and the oil control piston 31 and cam shaft 6 are forced to the right, the distance depending upon the extent to which the valve 45 constricts the escape of oil from the oil control cylinder 30. The operator can close or open the valve 45 to any desired point and so can cause the cam shaft 6 to be slid to any desired point, thus moving the cam shaft 6 and cam 7 to any position relative to cam roller 28 and consequently effecting any desired power output from the engine up to the maximum possible amount and varied speeds of rotation of its crank shaft.

It is evident that if the valve 45 be placed at any position and be not changed, the engine will run at a certain speed. If for some reason the speed decreases, less oil will be forced into the oil control cylinder 30 and the springs 34 will force the oil control piston 31 and cam shaft 6 to the left, toward the head 33 of the oil control cylinder 30. The result is that the engine speed increases. If for some reason the engine speed increases, more oil will be forced into the oil control cylinder 20 and the oil control piston 31 and cam shaft 6 will be forced to the right away from the head 33 of the oil control cylinder 30. The result is that the engine speed decreases. Thus by means of this oil control system I not only make the engine provide the energy necessary for its control, but I also effect governing of the speed of the engine.

This governing of the speed of the engine would be desirable for the following reasons: When the fresh fuel and oil and air mixture enters the cylinder above the piston through the intake valves 12, it comes into contact with the residue of burned gases which are in the cylinder and forces these burned gases out of the cylinder through the exhaust ports, the fresh fuel and air and oil mixture taking the place of the residue of burned gases in the cylinder. There is sure to be some mixing of the fuel and oil and air mixture with the residue of burned gases in the cylinder. When the cam shaft 6 and cam 7 are in their extreme left hand position, relative to cam roller 28, and consequently the time of closing of the intake valves 12 relative to the position of the piston 3 in the cylinder is not delayed at all, there will be no serious result from this mixing, but when the cam shaft 6 and cam 7 are moved to the right relative to the cam roller 28 there may be serious result because at such time the time of closing of the intake valves 12 is delayed and part of the contents of the cylinder above the piston 3 is forced back into the intake passage 25 and the tube 24 leading to the interior of the crank case. Thus when the cam shaft 6 and cam 7 are moved considerably to the right, relative to the cam roller 28, some of the residue of burned gas which has mixed with the fresh fuel and oil and air mixture might be forced back into the intake passage 25 and the tube 24 leading to the interior of the crank case. Thus the following charge of fuel and oil and air mixture entering the cylinder would be partially fouled and made less potent by the fraction of burned gas which would be mixed with it. Then more burned gas would be forced back into the intake passage 25 and the tube 24 the next time that the piston ascended with the result that the following charge of fuel and oil and air mixture entering the cylinder would contain a greater fraction of burned gas than the previous one. Thus as the engine continued to operate the result would be a greater and greater fraction of burned gas in the charge of fuel and oil and air mixture entering the cylinder. The result of this would be that the engine speed would decrease. But the oil control system, through its effect as a governor of the speed of the engine, takes care of this result by effecting at such times movement of the cam shaft 6 and cam 7 to the left, relative to cam roller 28, and the engine speed increases and also the fraction of burned gas contained in the following charges of fuel and oil and air mixture entering the cylinder decreases.

I have purposely designed this engine so that there is sufficient volume in the intake passage 25 and tube 24 so that little of the burned gas from the cylinder is likely to be forced back into the interior of the crank case.

In this engine the oil that is mixed with the fuel lubricates practically everything in the motor. The gears 8, 9 and 10, and gears 37 and 38 are lubricated by means of putting oil into the cases in which these gears rotate, through suitable orifices. Plug 27 closes one of these orifices. The working parts in the oil control system are lubricated by the oil by means of which the control is effected. It is desirable to use in the oil control system oil that remains a thin liquid at very low temperatures.

While I have herein shown and particularly described the preferred embodiment of my invention I do not wish to be limited to the precise details of construction shown as changes may readily be made without departing from the spirit of my invention, but having thus described my invention I claim as new and desire to secure by Letters Patent the following:—

1. An internal combustion engine including a gas receiving crank case; a first cylinder in communication with said crank case; a first piston operating in said first cylinder; a crank shaft coupled with said first piston; a crank included in the coupling between said first piston and said crank shaft; an exhaust port in said first cylinder opened and closed by said first piston and positioned to be uncovered by said first piston at the termination of its movement toward said crank shaft; a source of gaseous fuel; means in connection with an engine driven part to be positively operated thereby for permitting flow of said fuel to and obstructing flow of said fuel from said crank case; a valve at the end of said first cylinder remote from said crank case for permitting and obstructing flow of said fuel between said crank case and said first cylinder; a cam having different parts for effecting closure of said valve at different times with relation to the position of said first piston in said first cylinder; a cam shaft movable longitudinally upon its axis for adjusting the position of said cam to bring the different parts thereof into operation; a second piston in mechanical connection with and movable upon its longitudinal axis with said cam shaft; a second cylinder fixed relatively to said crank case, said second cylinder having a head, and said second piston operating in said second cylinder to bring the different parts of said cam into operation for effecting closure of said valve at different times with relation to the position of said first piston in said first cylinder; a spring exerting pressure against one side of said second piston; a pump operatively connected to said crank shaft and whose outlet discharges into the space between the head of said second cylinder and the side of said second piston other to the side against which said spring exerts pressure; and a manually operable valve for varying the size of the exit from the space between the head of said second cylinder and the side of said second piston other to the side against which said spring exerts pressure.

2. An internal combustion engine including a gas receiving crank case; a first cylinder in communication with said crank case; a first piston operating in said first cylinder; a crank shaft coupled with said first piston; a crank included in the coupling between said first piston and said crank shaft; an exhaust port in said first cylinder opened and closed by said first piston and positioned to be uncovered by said first piston at the termination of its movement toward said crank shaft; a source of gaseous fuel; means for permitting flow of said fuel to and obstructing flow of said fuel from said crank case; a valve at the end of said first cylinder remote from said crank case for permitting and obstructing flow of said fuel between said crank case and said first cylinder; a cam having different parts for effecting closure of said valve at different times with relation to the position of said first piston in said first cylinder; a cam shaft movable longitudinally upon its axis for adjusting the position of said cam to bring the different parts thereof into operation; a second piston in mechanical connection with and movable upon its longitudinal axis with said cam shaft; a second cylinder fixed relatively to said crank case, said second cylinder having a head, and said second piston operating in said second cylinder to bring the different parts of said cam into operation for effecting closure of said valve at different times with relation to the position of said first piston in said first cylinder; a spring exerting pressure against one side of said second piston; a pump operatively connected to said crank shaft and whose outlet discharges into the space between the head of said second cylinder and the side of said second piston other to the side against which said spring exerts pressure; and a manually operable valve for varying the size of the exit from the space between the head of said second cylinder and the side of said second piston other to the side against which said spring exerts pressure.

In witness whereof, I hereunto subscribe my name this eighteenth day of June, A. D. 1919.

STANLEY B. ARNOLD.